(12) United States Patent
Kurota et al.

(10) Patent No.: US 11,743,436 B2
(45) Date of Patent: Aug. 29, 2023

(54) PROJECTION METHOD AND NON-TRANSITORY COMPUTER-READABLE STORAGE MEDIUM STORING A PROGRAM

(71) Applicant: SEIKO EPSON CORPORATION, Tokyo (JP)

(72) Inventors: Ippei Kurota, Matsumoto (JP); Yoichi Shishido, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/546,689

(22) Filed: Dec. 9, 2021

(65) Prior Publication Data

US 2022/0191443 A1 Jun. 16, 2022

(30) Foreign Application Priority Data

Dec. 10, 2020 (JP) ................................. 2020-204894

(51) Int. Cl.
*H04N 9/31* (2006.01)
*G03B 21/14* (2006.01)

(52) U.S. Cl.
CPC ......... *H04N 9/3185* (2013.01); *G03B 21/147* (2013.01)

(58) Field of Classification Search
CPC ................ G03B 21/147; G03B 21/208; G03B 21/2053; H04N 9/31; H04N 9/315; H04N 9/3161; H04N 9/3179; H04N 9/3185; H04N 9/3194
See application file for complete search history.

(56) References Cited

U.S. PATENT DOCUMENTS

| 9,916,123 | B2* | 3/2018 | Natori | G06F 3/147 |
| 11,006,066 | B2* | 5/2021 | Ichieda | G03B 17/54 |
| 2011/0032381 | A1* | 2/2011 | Nara | H04N 5/2353 |
| | | | | 348/E5.037 |
| 2016/0119602 | A1 | 4/2016 | Yushiya | |
| 2021/0258551 | A1* | 8/2021 | Yang | G06V 30/1423 |
| 2021/0266505 | A1* | 8/2021 | Yamauchi | H04N 9/3194 |

FOREIGN PATENT DOCUMENTS

| JP | 2016-63394 A | 4/2016 |
| JP | 2016-85379 A | 5/2016 |

* cited by examiner

*Primary Examiner* — Sultan Chowdhury
(74) *Attorney, Agent, or Firm* — Oliff PLC

(57) ABSTRACT

A projection method including specifying a first correspondence between a projector coordinate system and a camera coordinate system, based on a first picked-up image and a first image, determining a second correspondence between the projector coordinate system and the camera coordinate system, based on a second picked-up image and a second image, generating correction information, based on one or a plurality of first feature points in a third image acquired by converting the first picked-up image into the projector coordinate system, based on the first correspondence, and one or a plurality of second feature points corresponding to the one or plurality of the first feature points, in a fourth image acquired by converting the second picked-up image into the projector coordinate system, based on the second correspondence, and projecting the projection image that is corrected based on the correction information.

11 Claims, 5 Drawing Sheets

PROJECTION METHOD AND NON-TRANSITORY COMPUTER-READABLE STORAGE MEDIUM STORING A PROGRAM

The present application is based on, and claims priority from JP Application Serial Number 2020-204894, filed Dec. 10, 2020, the disclosure of which is hereby incorporated by reference herein in its entirety.

BACKGROUND

1. Technical Field

The present disclosure relates to a projection method, a projection system, and a program.

2. Related Art

JP-A-2016-85379 discloses a technique of generating a projection image projected from a projector onto a screen, adapting to a change in positional relationship between the projector and the screen. The projector disclosed in JP-A-2016-85379 has an image pickup device. The projector disclosed in JP-A-2016-85379 causes the image pickup device to pick up an image of the screen after a movement and thus acquires position information representing the position of the screen after the movement. The projector disclosed in JP-A-2016-85379 specifies the position and direction of the screen, based on the acquired position information, and generates an appropriate projection image corresponding to the specified position and direction of the screen.

It is convenient if an image of the screen after the movement can be picked up, using an image pickup device that can freely change position such as an image pickup device included in a terminal like a smartphone or a tablet which a user holds in a hand to use. However, JP-A-2016-85379 does not take into account the use of an image pickup device that is separate from the projector and is not fixed.

SUMMARY

A projection method according to an aspect of the present disclosure projects a projection image onto a projection target object from a projector. The projection method includes: causing the projector to project a first image onto the projection target object before projecting the projection image; storing a first picked-up image of the projection target object in a state where the first image is projected, picked up by an image pickup device; specifying a first correspondence between a projector coordinate system representing a position on an image projected from the projector and a camera coordinate system representing a position on an image picked up by the image pickup device, based on the first picked-up image and the first image; causing the projector to project a second image onto the projection target object in response to reception of a control signal representing occurrence of a change in a positional relationship between the projector and the projection target object, after storing the first picked-up image; storing a second picked-up image of the projection target object in a state where the second image is projected, picked up by the image pickup device; specifying a second correspondence between the projector coordinate system and the camera coordinate system, based on the second picked-up image and the second image; generating correction information representing an amount of correction corresponding to the change in the positional relationship, based on one or a plurality of first feature points in a third image acquired by converting the stored first picked-up image into the projector coordinate system, based on the first correspondence, and one or a plurality of second feature points corresponding to the one or plurality of the first feature points, in a fourth image acquired by converting the stored second picked-up image into the projector coordinate system, based on the second correspondence; and causing the projector to project the projection image that is corrected based on the correction information.

A projection method according to another aspect of the present disclosure projects a projection image onto a projection target object from a projector. The projection method includes: causing the projector to project a first image onto the projection target object before projecting the projection image; storing a first picked-up image of the projection target object in a state where the first image is projected, picked up by an image pickup device from a first position; specifying a first correspondence between a projector coordinate system representing a position on an image projected from the projector and a camera coordinate system representing a position on an image picked up by the image pickup device, based on the first picked-up image and the first image; causing the projector to project a second image onto the projection target object in response to reception of a control signal representing occurrence of a change in a positional relationship between the projector and the projection target object, after storing the first picked-up image; storing a second picked-up image of the projection target object in a state where the second image is projected, picked up by the image pickup device from a second position; specifying a second correspondence between the projector coordinate system and the camera coordinate system, based on the second picked-up image and the second image; storing a third picked-up image of the projection target object picked up by the image pickup device from the first position, before causing the projector to project the second image onto the projection target object in response to the reception of the control signal; storing a fourth picked-up image of the projection target object picked up by the image pickup device from the second position, after causing the projector to project the second image onto the projection target object in response to the reception of the control signal; generating correction information representing an amount of correction corresponding to the change in the positional relationship, based on one or a plurality of first feature points in a fifth image acquired by converting the stored third picked-up image into the projector coordinate system, based on the first correspondence, and one or a plurality of second feature points corresponding to the one or plurality of the first feature points, in a sixth image acquired by converting the stored fourth picked-up image into the projector coordinate system, based on the second correspondence; and causing the projector to project the projection image that is corrected based on the correction information.

A projection system according to still another aspect of the present disclosure includes: a projector projecting a projection image onto a projection target object; and an information processing device controlling the projector. The information processing device includes: an image pickup device; a storage device; and a processing device. The processing device executes: causing the projector to project a first image onto the projection target object before projecting the projection image; causing the storage device to store a first picked-up image of the projection target object in a state where the first image is projected, picked up by the image pickup device; specifying a first correspondence between a projector coordinate system representing a position on an image projected from the projector and a camera coordinate system representing a position on an image picked up by the image pickup device, based on the first picked-up image and the first image; causing the projector to project a second image onto the projection target object in response to reception of a control signal representing occurrence of a change in a positional relationship between the projector and the projection target object, after causing the storage device to store the first picked-up image; causing the storage device to store a second picked-up image of the projection target object in a state where the second image is projected, picked up by the image pickup device; specifying a second correspondence between the projector coordinate system and the camera coordinate system, based on the second picked-up image and the second image; generating correction information representing an amount of correction corresponding to the change in the positional relationship, based on one or a plurality of first feature points in a third image acquired by converting the stored first picked-up image into the projector coordinate system, based on the first correspondence, and one or a plurality of second feature points corresponding to the one or plurality of the first feature points, in a fourth image acquired by converting the stored second picked-up image into the projector coordinate system, based on the second correspondence; and causing the projector to project the projection image that is corrected based on the correction information.

A non-transitory computer-readable storage medium according to still another aspect of the present disclosure stores a program that causes a computer which controls a projector projecting a projection image onto a projection target object, to execute: causing the projector to project a first image onto the projection target object before projecting the projection image; causing a storage device to store a first picked-up image of the projection target object in a state where the first image is projected, picked up by an image pickup device; specifying a first correspondence between a projector coordinate system representing a position on an image projected from the projector and a camera coordinate system representing a position on an image picked up by the image pickup device, based on the first picked-up image and the first image; causing the projector to project a second image onto the projection target object in response to reception of a control signal representing occurrence of a change in a positional relationship between the projector and the projection target object, after causing the storage device to store the first picked-up image; causing the storage device to store a second picked-up image of the projection target object in a state where the second image is projected, picked up by the image pickup device; specifying a second correspondence between the projector coordinate system and the camera coordinate system, based on the second picked-up image and the second image; generating correction information representing an amount of correction corresponding to the change in the positional relationship, based on one or a plurality of first feature points in a third image acquired by converting the first picked-up image stored in the storage device into the projector coordinate system, based on the first correspondence, and one or a plurality of second feature points corresponding to the one or plurality of the first feature points, in a fourth image acquired by converting the second picked-up image stored in the storage device into the projector coordinate system, based on the second correspondence; and causing the projector to project the projection image that is corrected based on the correction information.

DESCRIPTION OF EXEMPLARY EMBODIMENTS

An embodiment of the present disclosure will now be described with reference to the drawings. In the embodiment described below, various technically preferable limitations are described. However, the present disclosure is not limited to the embodiment described below.

1. Embodiment

Figure 1:
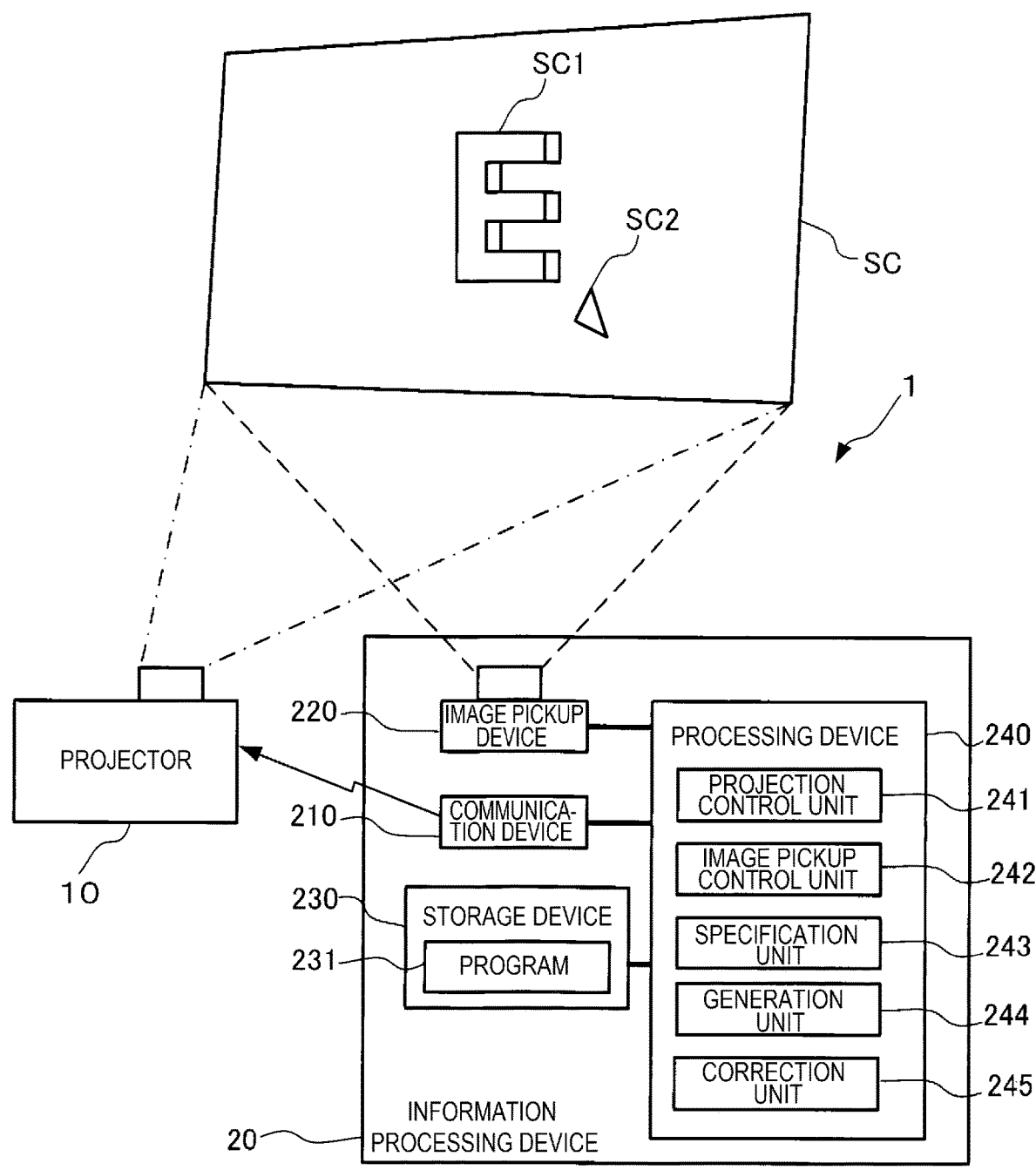
FIG. 1 is a block diagram showing an example of the configuration of a projection system according to an embodiment of the present disclosure.

FIG. 1 shows an example of the configuration of a projection system 1 according to an embodiment of the present disclosure. As shown in FIG. 1, the projection system 1 includes a projector 10 and an information processing device 20. In the projection system 1 shown in FIG. 1, the projector 10 projects an image for decorating a projection target object SC onto the projection target object SC under the control of the information processing device 20. The information processing device 20 is a device for controlling the projector 10. In the projection system 1, the information processing device 20 plays the role of an image supply device that supplies the projector 10 with image data representing an image to be projected onto the projection target object SC. The information processing device 20 in this embodiment is, for example, a smartphone having an image pickup function. A user can pick up an image of the projection target object SC from an arbitrary position, using the information processing device 20. The information processing device 20 is not limited to a smartphone and may also be a tablet terminal having an image pickup function or a personal computer having an image pickup function.

The projector 10 has, for example, a liquid crystal light valve for projecting an image, a projection lens, a liquid crystal drive unit, and an ultra-high-pressure mercury lamp as a light source. The light source in the projector 10 may also be a metal halide lamp. The projector 10 is communicatively coupled to the information processing device 20, for example, via a cable. The projector 10 acquires image data representing an image to be projected onto the projection target object SC from the information processing device 20 by communication via the cable. In this embodiment, the communication between the projector 10 and the information processing device 20 is, for example, wired communication conforming to the Ethernet or USB (Universal Serial Bus) standard or the like. Ethernet is a registered trademark. The communication between the projector 10 and the information processing device 20 may also be wireless communication conforming to the Wi-Fi standard or the like. The projector 10 projects the image represented by the acquired image data onto the projection target object SC.

Figure 2:
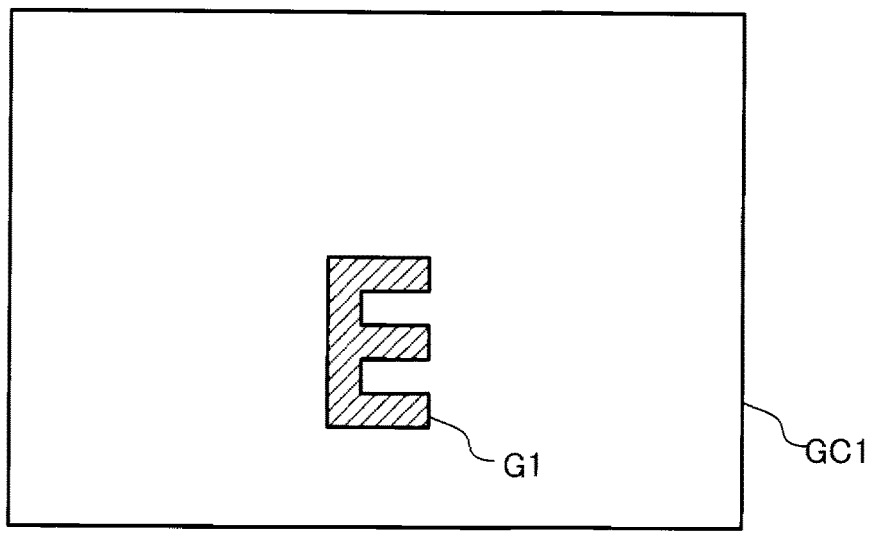
FIG. 2 shows an example of an image projected on a projection target object by a projector included in the projection system.

As shown in FIG. 1, the projection target object SC in this embodiment is a screen having an area SC1 where a letter E is stereoscopically formed. The projection target object SC also has an area SC2 demarcated by drawing a triangle near the bottom right corner of the area SC1. FIG. 2 shows an example of an image GC1 projected on the projection target object SC by the projector 10 under the control of the information processing device 20. The image GC1 includes an image G1 of the letter E painted in a predetermined color. In FIG. 2, the predetermined color is expressed by hatching.

Figure 3:
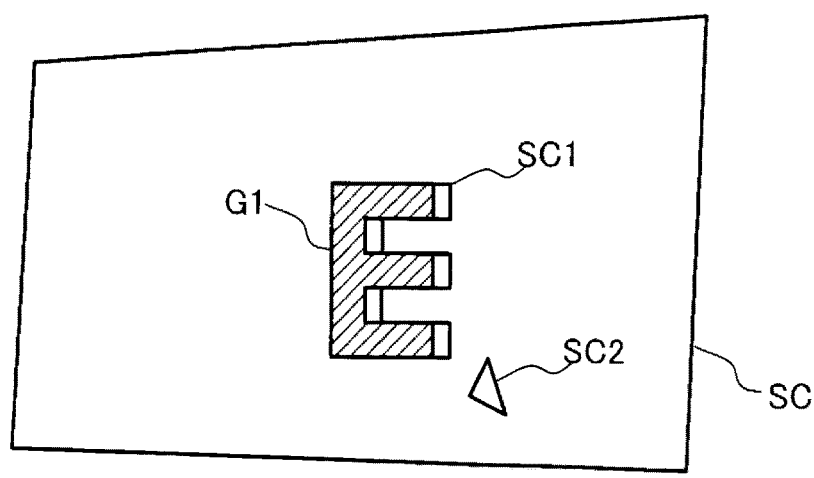
FIG. 3 shows an example of a positional relationship between the projection target object, the image projected by the projector, and an area.
Figure 4:
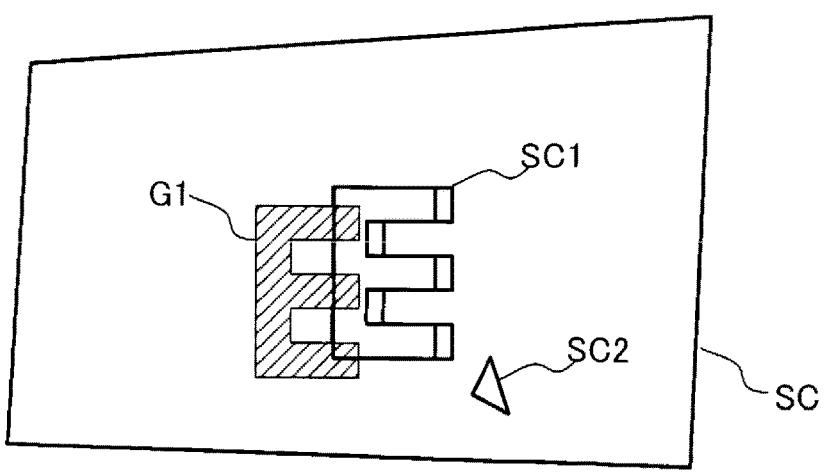
FIG. 4 shows an example of the positional relationship between the projection target object, the image projected by the projector, and the area.

In this embodiment, when the projector 10 projects the image GC1 on the projection target object SC, a positional relationship between the projector 10 and the projection target object SC is set in such away that the image G1 is superimposed on the area SC1, as shown in FIG. 3. Therefore, for example, when the positional relationship between the projector 10 and the projection target object SC is changed by a movement of the projection target object SC due to an external force or the like applied to the projection target object SC, the image G1 is no longer superimposed on the area SC1, as shown in FIG. 4. In this embodiment, the user can pick up an image of the projection target object SC after the movement, using the information processing device 20 freely changeable in position, and thus can correct the discrepancy between the image G1 and the area SC1, based on the result of the image pickup. Hereinafter, the embodiment will be described mainly in terms of the information processing device 20 clearly representing a feature of this embodiment.

As shown in FIG. 1, the information processing device 20 has a communication device 210, an image pickup device 220, a storage device 230, and a processing device 240. The projector 10 is coupled to the communication device 210 via the cable. The communication device 210 transmits image data provided from the processing device 240, to the projector 10.

The image pickup device 220 has, for example, CCD (charge-coupled device) or a CMOS (complementary metal-oxide semiconductor), which is an image pickup element converting condensed light into an electrical signal, or the like. The image pickup device 220 picks up an image under the control of the processing device 240. The image pickup device 220 outputs image data representing the picked-up image to the processing device 240. In the description below, in order to simplify the description, it is assumed that the image pickup device 220 picks up a still image.

The storage device 230 is a recording medium readable by the processing device 240. The storage device 230 includes, for example, a non-volatile memory and a volatile memory. The non-volatile memory is, for example, a ROM (read-only memory), an EPROM (erasable programmable read-only memory), or an EEPROM (electrically erasable programmable read-only memory). The volatile memory is, for example, a RAM (random-access memory).

In the non-volatile memory of the storage device 230, a program 231 executed by the processing device 240 is stored in advance. The program 231 can also be referred to as an "application program", "application software" or "app". The program 231 is acquired, for example, from a server, not illustrated, via the communication device 210 and subsequently stored in the storage device 230. The volatile memory of the storage device 230 is used as a work area by the processing device 240 when executing the program 231. In the volatile memory of the storage device 230, image data representing an image picked up by the image pickup device 220 is stored.

Figure 5:
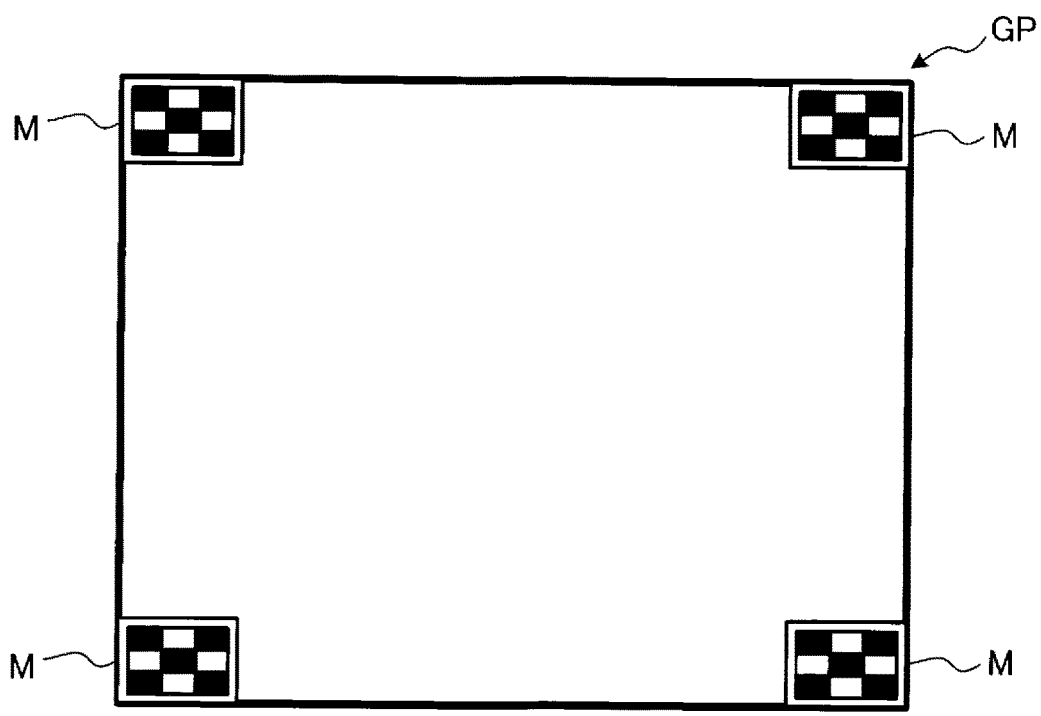
FIG. 5 shows an example of an image.

In the non-volatile memory of the storage device 230, image data representing the image GC1 shown in FIG. 2 is stored. The image data representing the image GC1 may also be stored in the volatile memory of the storage device 230. In the non-volatile memory of the storage device 230, image data representing an image for specifying a correspondence between a projector coordinate system and a camera coordinate system is stored. The projector coordinate system is a coordinate system representing a position within a projection image projected by the projector 10. A specific example of the projector coordinate system is a two-dimensional coordinate system having the origin at the top left corner of the projection image projected by the projector 10. The camera coordinate system is a coordinate system representing a position within a picked-up image picked up by the image pickup device 220. A specific example of the camera coordinate system is a two-dimensional coordinate system having the origin at the top left corner of the picked-up image picked up by the image pickup device 220. In this embodiment, the image for specifying the correspondence between the projector coordinate system and the camera coordinate system is a white image GP with a marker M arranged in the four corners, as shown in FIG. 5. The marker M arranged in the four corners of the image GP is an example of first, second, third, and fourth markers according to the present disclosure.

The processing device 240 includes, for example, a processor such as a CPU, that is, a computer. The processing device 240 may be formed of a single computer or a plurality of computers. The processing device 240 reads out the program 231 from the non-volatile memory to the volatile memory in response to an operation of giving an instruction to start to execute the program 231, performed at an input device, not illustrated. The input device is, for example, a touch panel or a push button provided in the information processing device 20. The input device may also be a remote controller or a keyboard that can communicate with the information processing device 20 via wired or wireless connection. The processing device 240 executes the read-out program 231. The processing device 240 operating according to the program 231 functions as a projection control unit 241, an image pickup control unit 242, a specification unit 243, a generation unit 244, and a correction unit 245 shown in FIG. 1. The projection control unit 241, the image pickup control unit 242, the specification unit 243, the generation unit 244, and the correction unit 245 shown in FIG. 1 are software modules implemented by the processing device 240 operating according to the program 231. The functions achieved by each of the projection control unit 241, the image pickup control unit 242, the specification unit 243, the generation unit 244, and the correction unit 245 are as described below.

The projection control unit 241 provides image data to the projector 10 and thus causes the projector 10 to project an image. For example, when an instruction to cause the projector 10 to project the image GC1 is given by an input to the input device, not illustrated, the projection control unit 241 reads out image data representing the image GC1 from the storage device 230 and transmits the read-out image data to the projector 10 via the communication device 210. When causing the projector 10 to project the image for specifying the correspondence between the projector coordinate system and the camera coordinate system, the projection control unit 241 reads out image data representing the image GP from the storage device 230 and transmits the read-out image data to the projector 10 via the communication device 210.

The image pickup control unit 242 causes the image pickup device 220 to pick up an image of the projection target object SC in the state where the image GP is projected. The image pickup control unit 242 then writes image data representing the picked-up image picked by the image pickup device 220 into the storage device 230 and thus causes the storage device 230 to store the picked-up image.

The specification unit 243 specifies the correspondence between the projector coordinate system and the camera coordinate system. The specification unit 243 calculates a transformation matrix for transformation between the positions of the four markers M in the picked-up image of the projection target object SC in the state where the image GP is projected and the positions of the four markers M in the image GP and thus specifies the correspondence between the projector coordinate system and the camera coordinate system.

In this embodiment, as will be described in detail later, at the point when the positional relationship between the projector 10 and the projection target object SC is initially set, the projection of the image GP by the projection control unit 241, the storage of the picked-up image by the image pickup control unit 242, and the specification of the correspondence by the specification unit 243 are executed before the projection of the image GC1 onto the projection target object SC. The image GP projected under the control of the projection control unit 241 before the projection of the image GC1 onto the projection target object SC is an example of a first image according to the present disclosure. The image picked up under the control of the image pickup control unit 242 before the projection of the image GC1 onto the projection target object SC is an example of a first picked-up image according to the present disclosure. The correspondence specified by the specification unit 243 before the projection of the image GC1 onto the projection target object SC is an example of a first correspondence according to the present disclosure.

In this embodiment, the projection of the image GP by the projection control unit 241, the storage of the picked-up image by the image pickup control unit 242, and the specification of the correspondence by the specification unit 243 are executed in response to the reception of a control signal representing the occurrence of a change in the positional relationship between the projector 10 and the projection target object SC, from the input device, not illustrated. The image GP which the projection control unit 241 causes the projector 10 to project in response to the reception of the control signal is an example of a second image according to the present disclosure. The image which the image pickup control unit 242 causes the image pickup device 220 to pick up in response to the reception of the control signal is an example of a second picked-up image according to the present disclosure. The correspondence specified by the specification unit 243 in response to the reception of the control signal is an example of a second correspondence according to the present disclosure.

The generation unit 244 generates correction information representing an amount of correction for the image GC1 corresponding to the change in the positional relationship between the projector 10 and the projection target object Sc. The generation unit 244 first converts the first picked-up image to an image in the projector coordinate system, based on the first correspondence. The image after the conversion based on the first correspondence is an example of a third image according to the present disclosure. The reason for converting the first picked-up image to the third image, based on the first correspondence, is described below.

It is now assumed, for example, that the projector 10 faces straight to the projection target object SC and that the image pickup device 220 faces straight to the projection target object SC. In the first picked-up image picked up in this state, the image GP is shown without any distortion. That the projector 10 faces straight to the projection target object SC means that the optical axis of projection light from the projector 10 and a normal line to a planar part of the projection target object SC are parallel to each other. Similarly, that the image pickup device 220 faces straight to the projection target object SC means that the center axis of an image pickup lens in the image pickup device 220 and a normal line to a planar part of the projection target object SC are parallel to each other. Meanwhile, in the image GP shown in the first picked-up image picked up in the state where the projector 10 does not face straight to the projection target object SC, a first distortion corresponding to the positional relationship between the projector 10 and the projection target object SC appears. Similarly, in the image GP shown in the first picked-up image picked up in the state where the image pickup device 220 does not face straight to the projection target object SC, a second distortion corresponding to the positional relationship between the image pickup device 220 and the projection target object SC appears. The third image is an image in the projector coordinate system and therefore is not dependent on the positional relationship between the image pickup device 220 and the projection target object SC. That is, the third image does not include the second distortion corresponding to the positional relationship between the image pickup device 220 and the projection target object SC. The purpose of converting the image represented by the first picked-up image data to the third image is to eliminate the second distortion, of the first distortion and the second distortion included in the image before the conversion.

Subsequently, the generation unit 244 converts the second picked-up image to an image in the projector coordinate system, based on the second correspondence. The image after the conversion based on the second correspondence is an example of a fourth image according to the present disclosure. As the second picked-up image is converted to an image in the projector coordinate system, based on the second correspondence, the second distortion, of the first distortion and the second distortion included in the image before the conversion, is eliminated.

Subsequently, the generation unit 244 generates correction information representing the amount of correction corresponding to the change in the positional relationship between the projector 10 and the projection target object SC, based on the third image and the fourth image. As described above, the third image does not include the second distortion corresponding to the positional relationship between the image pickup device 220 and the projection target object SC. Similarly, the fourth image does not include the second distortion corresponding to the positional relationship between the image pickup device 220 and the projection target object SC. Therefore, the amount of change in the first distortion can be calculated, based on the third image and the fourth image. The amount of change in the first distortion is a distortion corresponding to the difference between the positional relationship between the projector 10 and the projection target object SC as of when the first picked-up image is picked up and the positional relationship between the projector 10 and the projection target object SC as of when the second picked-up image is picked up. The generation unit 244 generates correction information to cancel this distortion, based on the third image and the fourth image.

Figure 6:
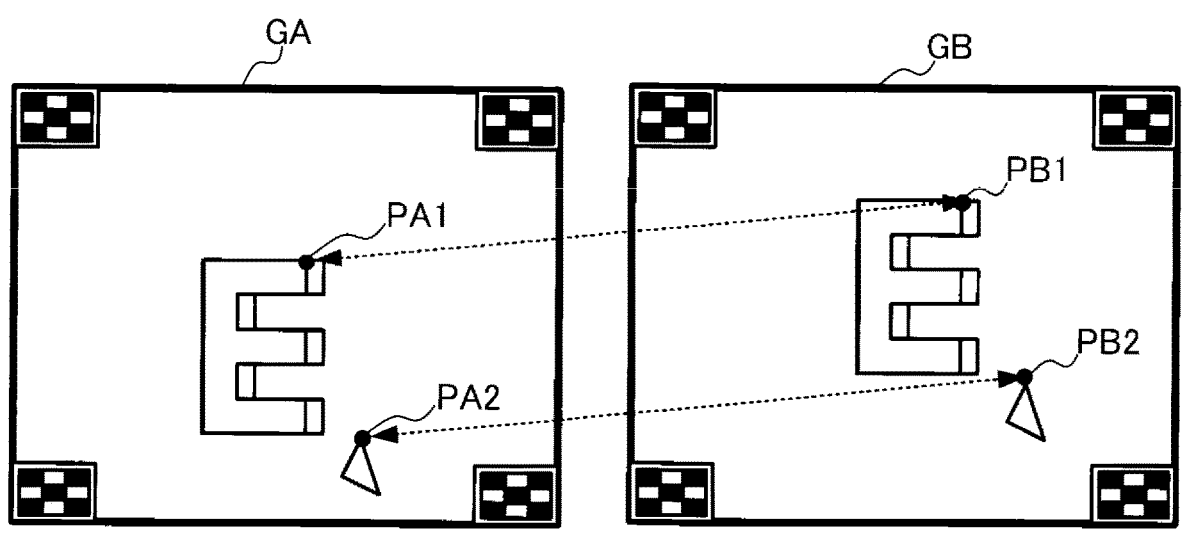
FIG. 6 explains generation processing executed by a generation unit.

To explain more in detail, the generation unit 244 generates correction information, based on the position(s) in the third image of N first feature point(s) extracted from the third image and the positions in the fourth image of N second feature point(s) extracted from the fourth image and corresponding one-to-one to the N first feature point(s). N is an integer equal to or greater than 1. The first feature point and the second feature point in this embodiment are natural feature points extracted based on color. The generation unit 244 extracts the N first feature point(s) from the third image, based on the luminance value of each pixel forming the third image. Similarly, the generation unit 244 extracts the N second feature point(s) from the fourth image, based on the luminance value of each pixel forming the fourth image. The generation unit 244 then establishes, for each of the N second feature point(s), the correspondence between the second feature point and the first feature point whose positional relationship or the like in the distribution of feature points is similar to the second feature point, and thus establishes the one-to-one correspondence between the N first feature point(s) and the N second feature point(s). As an algorithm for implementing the extraction of the first feature point and the second feature point and the correspondence between the first feature point and the second feature point, an existing algorithm such as AKAZE or SURF is used. For example, it is now assumed that, as shown in FIG. 6, two first feature points made up of a feature point PA1 corresponding to the top right corner of the area SC1 and a feature point PA2 corresponding to one of the vertices of the area SC2 are extracted from an image GA, which is the third image, and that two second feature points made up of a feature point PB1 and a feature point PB2 are similarly extracted according to the algorithm from an image GB, which is the fourth image. In this case, the generation unit 244 establishes the correspondence between the feature point PA1 and the feature point PB1 and the correspondence between the feature point PA2 and the feature point PB2, based on the positional relationship between the feature point PA1 and the feature point PA2 and the positional relationship between the feature point PB1 and the feature point PB2.

When N=1, the generation unit 244 generates a matrix for translating the first feature point to the second feature point, as the correction information. When N=2, the generation unit 244 generates a matrix expressing a linear transformation between the two first feature points and the two second feature points, as the correction information. When N=3, the generation unit 244 generates a matrix expressing an affine transformation between the three first feature points and the three second feature points, as the correction information. When N≥4, the generation unit 244 generates a matrix expressing a nomography transformation between the N first feature points and the N second feature points, as the correction information.

Figure 7:
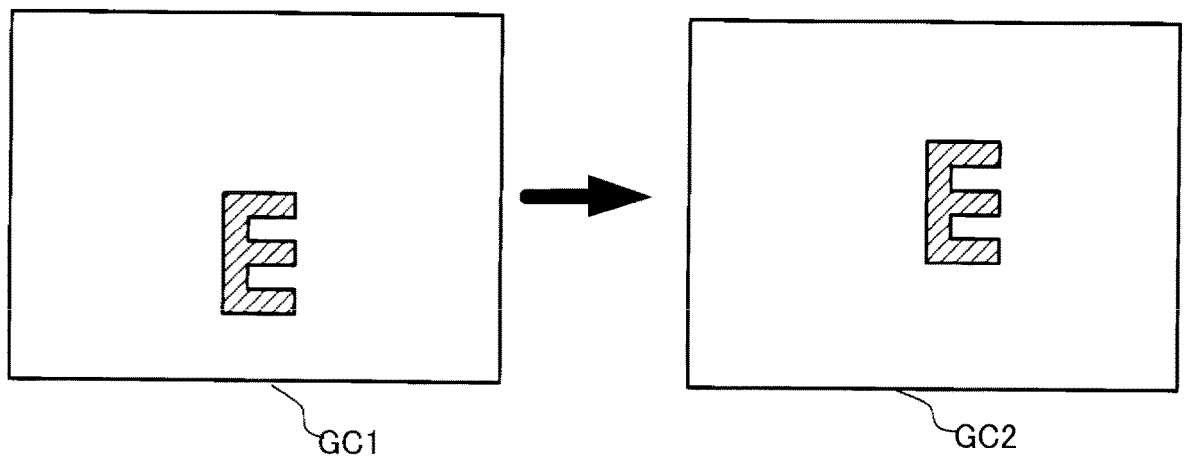
FIG. 7 explains correction processing executed by a correction unit.
Figure 8:
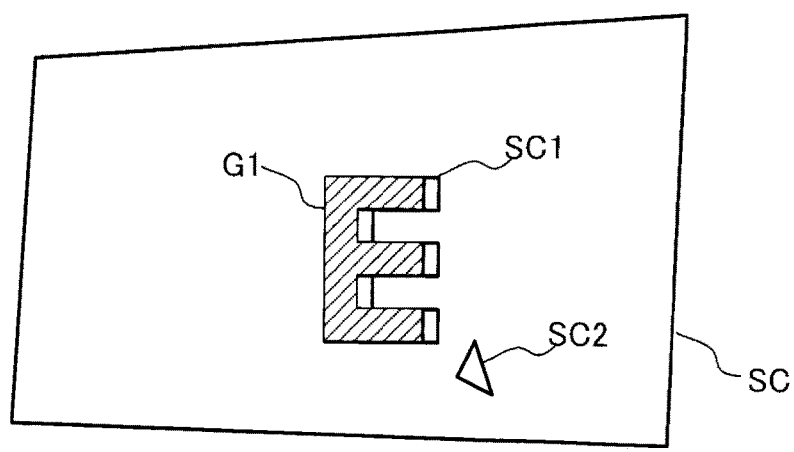
FIG. 8 shows an example of a positional relationship between the projection target object and an image projected by the projector.

The correction unit 245 corrects the image GC1 according to the correction information and thus generates an image GC2, as shown in FIG. 7. The correction unit 245 then causes the projector 10 to project the corrected image, that is, the image GC2. If the projector 10 is projecting the image GP on the projection target object SC when the correction unit 245 is to cause the projector 10 to project the image GC2, the correction unit 245 causes the projector 10 to project the image GC2 instead of the image GP. To explain more in detail, the correction unit 245 reads out the image data of the image GC1 from the storage device 230, moves the position of each pixel represented by the read-out image data, based on the correction information, and thus generates image data representing the image GC2. The correction unit 245 then provides the image data representing the image GC2 to the projector 10 and thus causes the projector 10 to project the image GC2. As a result of the projector 10 projecting the image GC2 onto the projection target object SC, the discrepancy between the area SC1 and the image G1 is corrected, as shown in FIG. 8.

The processing device 240 operating according to the program 231 executes the projection method according to the present disclosure. The projection method according to the present disclosure includes initial setting processing shown in the flowchart of FIG. 9 and adjustment processing shown in the flowchart of FIG. 10.

Figure 9:
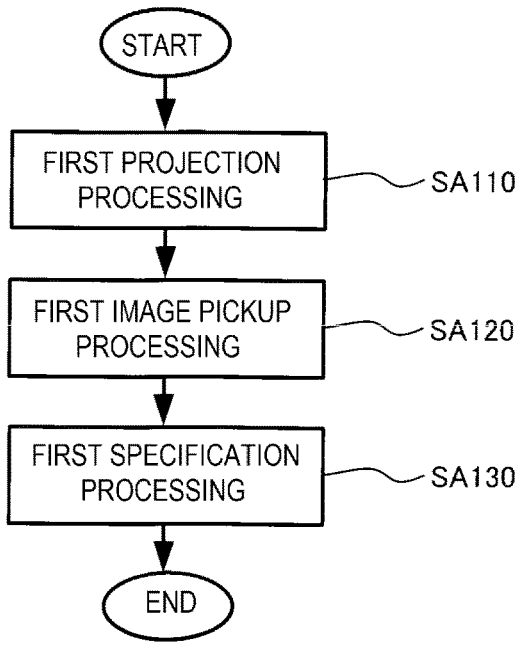
FIG. 9 is a flowchart showing a flow of initial setting processing executed by a processing device according to a program.

The initial setting processing shown in the flowchart of FIG. 9 is the processing executed before the projection of the projection image onto the projection target object SC. When the positional relationship between the projector 10 and the projection target object SC is decided, the user of the information processing device 20 inputs an instruction to execute the initial setting processing by operating the input device, not illustrated. The processing device 240 operating according to the program 231 executes the initial setting processing shown in the flowchart of FIG. 9 in response to the reception of the instruction to execute the initial setting processing from the input device. As shown in FIG. 9, the initial setting processing includes first projection processing SA110, first image pickup processing SA120, and first specification processing SA130.

In the first projection processing SA110, the processing device 240 functions as the projection control unit 241. In the first projection processing SA110, the processing device 240 causes the projector 10 to project the image GP. In the first image pickup processing SA120, the processing device 240 functions as the image pickup control unit 242. In the first image pickup processing SA120, in response to an image pickup instruction given by an operation on the input device, not illustrated, the processing device 240 causes the image pickup device 220 to pick up an image of the projection target object SC in the state where the image GP is projected, and causes the storage device 230 to store first picked-up image data representing this picked-up image. The position of the information processing device 20 as of when the first image pickup processing SA120 is executed, that is, the position of the image pickup device 220, is an example of a first position according to the present disclosure. In the first specification processing SA130, the processing device 240 functions as the specification unit 243. In the first specification processing SA130, the processing device 240 calculates a first transformation matrix for transformation between the positions of the four markers M in the first picked-up image and the positions of the four markers M in the image GP, and thus specifies the first correspondence between the projector coordinate system and the camera coordinate system. The processing device 240 causes the storage device 230 to store the first transformation matrix expressing the first correspondence.

As the above initial setting processing is executed, the first transformation matrix expressing the first correspondence corresponding to the positional relationship between the projector 10 and the projection target object SC decided before the projection of the image GC1 onto the projection target object SC is stored in the storage device 230.

Figure 10:
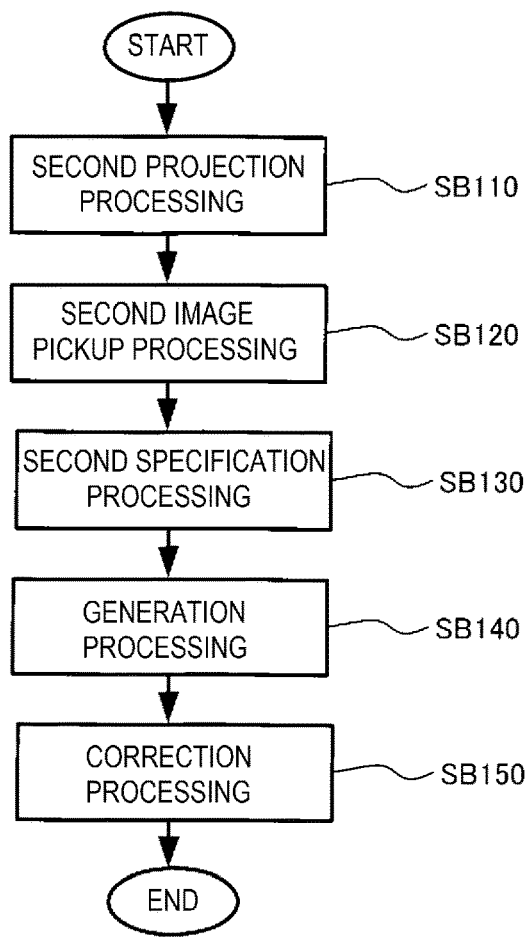
FIG. 10 is a flowchart showing a flow of adjustment processing executed by the processing device according to the program.

It is now assumed that an external force or the like is applied to the projection target object SC in the state where the projector 10 is projecting the image GC1 on the projection target object SC, and thus changes the positional relationship between the projector 10 and the projection target object SC and causes the image G1 to be projected with a discrepancy in position from the area SC1, as shown in FIG. 4. On visually recognizing the discrepancy between the image G1 and the area SC1, the user inputs that the positional relationship between the projector 10 and the projection target object SC is changed, by an operation on the input device, not illustrated. For example, an operation of selecting an item described as the start of readjustment displayed on the touch panel as the input device provided in the information processing device 20, can be employed as the operation on the input device, not illustrated, to input that the positional relationship between the projector 10 and the projection target object SC is changed. The input device outputs a control signal to the processing device 240 in response to this input. In response to the reception of the control signal, the processing device 240 executes the adjustment processing shown in the flowchart of FIG. 10. As shown in FIG. 10, the adjustment processing includes second projection processing SB110, second image pickup processing SB120, second specification processing SB130, generation processing SB140, and correction processing SB150.

In the second projection processing SB110, the processing device 240 functions as the projection control unit 241. In the second projection processing SB110, the processing device 240 causes the projector 10 to project the image GP instead of the image GC1. In the second image pickup processing SB120, the processing device 240 functions as the image pickup control unit 242. In the second image pickup processing SB120, in response to an image pickup instruction given by an operation on the input device, not illustrated, the processing device 240 causes the image pickup device 220 to pick up an image of the projection target object SC in the state where the image GP is projected, and causes the storage device 230 to store second picked-up image data representing this picked-up image. The position of the information processing device 20 as of when the second image pickup processing SB120 is executed, that is, the position of the image pickup device 220, is an example of a second position according to the present disclosure. In the second specification processing SB130, the processing device 240 functions as the specification unit 243. In the second specification processing SB130, the processing device 240 calculates a second transformation matrix for transformation between the positions of the four markers M in the second picked-up image and the positions of the four markers M in the image GP, and thus specifies the second correspondence between the projector coordinate system and the camera coordinate system. The processing device 240 causes the storage device 230 to store the second transformation matrix expressing the second correspondence.

In the generation processing SB140, the processing device 240 functions as the generation unit 244. In the generation processing SB140, the processing device 240 first converts the image represented by the first picked-up image data to the third image in the projector coordinate system, based on the first correspondence. The processing device 240 then converts the image represented by the second picked-up image data to the fourth image in the projector coordinate system, based on the second correspondence. The processing device 240 then generates correction information representing the amount of correction corresponding to the change in the positional relationship between the projector 10 and the projection target object SC, based on the third image and the fourth image.

In the correction processing SB150, the processing device 240 functions as the correction unit 245. In the correction processing SB150, the processing device 240 corrects the image GC1 according to the correction information and thus generates the image GC2. The processing device 240 then causes the projector 10 to project the corrected image, that is, the image GC2, instead of the image GP. As a result of the projector 10 projecting the image GC2 onto the projection target object SC, the discrepancy between the area SC1 and the image G1 is corrected as shown in FIG. 8, as described above.

The execution of the above adjustment processing enables the projector 10 to project the image GC2 formed by making a correction to cancel a change in the positional relationship between the projector 10 and the projection target object SC even when such a change occurs. As described above, the image pickup device 220 in this embodiment is included in the information processing device 20, which is separate from the projector 10. Also, since the user holds the information processing device 20 in a hand for use, the information processing device 20 is not fixed. Therefore, the first position and the second position may not necessarily coincide with each other. However, in this embodiment, since the correction information is generated based on the third image and the fourth image, there is no problem even when the first position and the second position do not coincide with each other. In this way, according to this embodiment, since an image of the projection target object SC is picked up using the image pickup device 220, which is separate from the projector 10 and not fixed, the projection image projected onto the projection target object SC from the projector 10 can be generated, adapting to a change in the positional relationship between the projector 10 and the projection target object SC.

2. Modification Examples

The embodiment may be changed in the following manners.

(1) In the embodiment, the first image and the second image for specifying the correspondence between the projector coordinate system and the camera coordinate system are images with the first, second, third, and fourth markers arranged in the four corners. However, the first image and the second image may be pattern images showing one of a binary code pattern, a Gray code pattern, and a phase shift pattern. Also, when the difference between the luminance of a first pixel in the third image and the luminance of a second pixel corresponding to the first pixel, in the fourth image, is equal to or greater than a threshold, the correction information may be generated. This is because that the difference between the luminance of the first pixel and the luminance of the second pixel is less than the threshold means that the discrepancy in the position of the projection image due to the change in the positional relationship between the projector 10 and the projection target object SC is small.

The type of the first image and the type of the second image may be different from each other. For example, the first image may be an image with the first, second, third, and fourth markers arranged in the four corners, whereas the second image may be an image of a binary code pattern. This is because there is no problem in the specification of the first correspondence even when the type of the second image is different from the type of the first image, since the second image and the picked-up image of the projection target object SC in the state where the second image is projected are not used for the specification of the first correspondence. Similarly, there is no problem in the specification of the second correspondence even when the type of the second image is different from the type of the first image. Thus, the type of the first image and the type of the second image may be different from each other.

(2) In the embodiment, the generation unit 244 extracts N first feature point(s) from the third image. However, the generation unit 244 may extract N natural feature point(s) from the first picked-up image, convert the N natural feature point(s) into the projector coordinate system, based on the first correspondence, and thus extract N first feature point(s). Second feature points may be extracted similarly. In the embodiment, the generation unit 244 extracts N first feature point(s) and N second feature point(s) corresponding one-to-one to the N first feature point(s). However, the generation unit 244 may extract M first feature points and M second feature points corresponding one-to-one to the M first feature points, M being an integer greater than N, and generate the correction information, using N first feature point(s) of the M first feature points and N second feature point(s) corresponding one-to-one to the N first feature points. The user may select the N first feature point(s) of the M first feature points. The generation unit 244 may specify a first area corresponding to the area SC1, in the third image, by performing edge extraction or the like on the third image, and specify a second area corresponding to the area SC1, in the fourth image, by performing edge extraction or the like on the fourth image. The generation unit 244 may generate the correction information, using one or a plurality of first feature points located in the first area, of the M first feature points, and one or a plurality of second feature points located in the second area, of the M second feature points.

(3) In the embodiment, the control signal representing the change in the positional relationship between the projector 10 and the projection target object SC is outputted from the input device accepting an operation by the user. However, a sensor detecting a vibration may be provided in at least one of the projector 10 and the projection target object SC, and the control signal representing the change in the positional relationship between the projector 10 and the projection target object SC may be transmitted from the sensor to the processing device 240.

(4) In the embodiment, the first specification processing SA130 is included in the initial setting processing. However, the first specification processing SA130 may be included in the adjustment processing. When the first specification processing SA130 is included in the adjustment processing, the first specification processing SA130 may be executed in any order in relation to the second projection processing SB110, the second image pickup processing SB120, and the second specification processing SB130, provided that the first specification processing SA130 is executed before the generation processing SB140. Specifically, the first specification processing SA130 may be executed before the second projection processing SB110 or may be executed after the second specification processing SB130. In the embodiment, the information processing device 20 plays the role of an image supply device. However, an image supply device may be provided separately from the information processing device 20. In the configuration where an image supply device is provided separately from the information processing device 20, the correction processing SB150 is the processing of transmitting the correction information generated by the generation processing SB140 to the projector 10 or the image supply device and causing the projector 10 or the image supply device to correct the projection image according to the correction information. In the embodiment, the adjustment processing is executed in response to the reception of the control signal representing the occurrence of the change in the positional relationship between the projector 10 and the projection target object SC in the state where the projector 10 is projecting the image GC1 on the projection target object SC. However, the adjustment processing may be executed in response to the reception of the control signal regardless of whether the projector 10 is projecting the image GC1 on the projection target object SC or not, provided that the adjustment processing is performed after the first picked-up image data is stored.

(5) The information processing device 20 having the program 231 already stored in the storage device 230 may be manufactured or sold separately as a single device. In the embodiment, the program 231 is already stored in the storage device 230 of the information processing device 20. However, the program 231 may be manufactured or distributed separately as a single product. As a specific method for distributing the program 231, the program 231 may be written in a computer-readable medium such as a flash ROM (read-only memory) and thus distributed, or may be downloaded via a telecommunication line such as the internet and thus distributed.

(6) The projection control unit 241, the image pickup control unit 242, the specification unit 243, the generation unit 244, and the correction unit 245 in the embodiment are software modules. However, a part or all of the projection control unit 241, the image pickup control unit 242, the specification unit 243, the generation unit 244, and the correction unit 245 may be hardware. An example of this hardware may be a DSP (digital signal processor), an ASIC (application-specific integrated circuit), a PLD (programmable logic device), and an FPGA (field-programmable gate array). The same effects as in the embodiment are achieved even when a part or all of the projection control unit 241, the image pickup control unit 242, the specification unit 243, the generation unit 244, and the correction unit 245 are hardware.

(7) In the embodiment, the generation unit 244 extracts N first feature point(s) from the third image formed by converting the image represented by the first picked-up image data, based on the first correspondence. However, the generation unit 244 may extract N first feature point(s) from a third picked-up image that is different from the first picked-up image, of the projection target object SC picked up by the image pickup device 220 when the positional relationship between the projector 10, the projection target object SC, and the image pickup device 220 is the same as the positional relationship as of when the first picked-up image is picked up. For example, the specification unit 243 specifies the first correspondence, based on the first picked-up image of the projection target object SC in the state where the projector 10 is projecting the image GP, picked up by the image pickup device 220, and the image GP. The generation unit 244 acquires the third picked-up image of the projection target object SC in the state where the projector 10 is projecting a black image, picked up by the image pickup device 220 when the positional relationship between the projector 10, the projection target object SC, and the image pickup device 220 is the same as the positional relationship as of when the first picked-up image is picked up. The generation unit 244 then may extract N first feature point(s) from a fifth image formed by converting the third picked-up image, based on the first correspondence. The position of the image pickup device 220 that achieves the positional relationship between the projector 10, the projection target object SC, and the image pickup device 220 as of when the first picked-up image is picked up, corresponds to the first position. The generation unit 244 may also acquire the third picked-up image of the projection target object SC in the state where the projector 10 is not projecting an image, picked up by the image pickup device 220 when the positional relationship between the projector 10, the projection target object SC, and the image pickup device 220 is the same as the positional relationship as of when the first picked-up image is picked up. The generation unit 244 then may extract N first feature point(s) from the fifth image formed by converting the third picked-up image, based on the first correspondence. The third picked-up image is picked up when the positional relationship between the projector 10, the projection target object SC, and the image pickup device 220 is the same as the positional relationship as of when the first picked-up image is picked up, and therefore can provide the fifth image by being converted into the projector coordinate system, based on the first correspondence. N first feature point(s) can be extracted from the fifth image, which is an image in the projector coordinate system.

(8) In the embodiment, the generation unit 244 extracts N second feature point(s) from the fourth image formed by converting the image represented by the second picked-up image data, based on the second correspondence. However, the generation unit 244 may extract N second feature point(s) from a fourth picked-up image that is different from the second picked-up image, of the projection target object SC picked up by the image pickup device 220 when the positional relationship between the projector 10, the projection target object SC, and the image pickup device 220 is the same as the positional relationship as of when the second picked-up image is picked up. For example, the specification unit 243 specifies the second correspondence, based on the second picked-up image of the projection target object SC in the state where the projector 10 is projecting the image GP, picked up by the image pickup device 220, and the image GP. The generation unit 244 acquires the fourth picked-up image of the projection target object SC in the state where the projector 10 is projecting a black image, picked up by the image pickup device 220 when the positional relationship between the projector 10, the projection target object SC, and the image pickup device 220 is the same as the positional relationship as of when the second picked-up image is picked up. The generation unit 244 then may extract N second feature point(s) from a sixth image formed by converting the fourth picked-up image, based on the second correspondence. The position of the image pickup device 220 that achieves the positional relationship between the projector 10, the projection target object SC, and the image pickup device 220 as of when the second picked-up image is picked up, corresponds to the second position. The generation unit 244 may also acquire the fourth picked-up image of the projection target object SC in the state where the projector 10 is not projecting an image, picked up by the image pickup device 220 when the positional relationship between the projector 10, the projection target object SC, and the image pickup device 220 is the same as the positional relationship as of when the second picked-up image is picked up. The generation unit 244 then may extract N second feature point(s) from the sixth image formed by converting the fourth picked-up image, based on the second correspondence. The fourth picked-up image is picked up when the positional relationship between the projector 10, the projection target object SC, and the image pickup device 220 is the same as the positional relationship as of when the second picked-up image is picked up, and therefore can provide the sixth image by being converted into the projector coordinate system, based on the second correspondence. N second feature point(s) can be extracted from the sixth image, which is an image in the projector coordinate system.

3. Aspects Grasped from at Least One of Embodiment and Modification Examples

The present disclosure is not limited to the above embodiment and modification examples and can be implemented according to various aspects without departing from the spirit and scope of the present disclosure. For example, the present disclosure can be implemented according to the aspects described below. A technical feature described in the embodiment corresponding to a technical feature according to the aspects described below can be suitably replaced or combined in order to solve a part or all of the problems according to the present disclosure or in order to achieve a part or all of the effects according to the present disclosure. The technical feature can be suitably deleted unless described as essential in the specification.

In order to solve the foregoing problems, according to an aspect of the present disclosure, a projection method for projecting a projection image onto the projection target object SC from the projector 10 is provided. The projection method includes the first projection processing SA110, the first image pickup processing SA120, the first specification processing SA130, the second projection processing SB110, the second image pickup processing SB120, the second specification processing SB130, the generation processing SB140, and the correction processing SB150, described below.

The first projection processing SA110 and the first image pickup processing SA120 are executed before the projection of the image GC1, which is the projection image, onto the projection target object SC. In the first projection processing SA110, the processing device 240 causes the projector 10 to project the image GP onto the projection target object SC. In the first image pickup processing SA120, the processing device 240 causes the storage device 230 to store the first picked-up image data representing the first picked-up image of the projection target object SC in the state where the image GP is projected, picked up by the image pickup device 220. The position of the image pickup device 220 in the first image pickup processing SA120 is an example of the first position according to the present disclosure. In the first specification processing SA130, the processing device 240 specifies the first correspondence between the projector coordinate system and the camera coordinate system, based on the first picked-up image represented by the first picked-up image data, and the image GP.

The second projection processing SB110, the second image pickup processing SB120, the second specification processing SB130, the generation processing SB140, and the correction processing SB150 are executed in response to the reception of the control signal representing the occurrence of the change in the positional relationship between the projector 10 and the projection target object SC by the processing device 240 via the communication device 210. In the second projection processing SB110, the processing device 240 causes the projector 10 to project the image GP onto the projection target object SC. Next, in the second image pickup processing SB120, the processing device 240 causes the storage device 230 to store the second picked-up image data representing the second picked-up image of the projection target object SC in the state where the image GP is projected, picked up by the image pickup device 220. The position of the image pickup device 220 in the second image pickup processing SB120 is an example of the second position according to the present disclosure. Then, in the second specification processing SB130, the processing device 240 specifies the second correspondence between the projector coordinate system and the camera coordinate system, based on the second picked-up image represented by the second picked-up image data, and the image GP.

In the generation processing SB140, the processing device 240 generates the correction information representing the amount of correction for the image GC1 corresponding to the change in the positional relationship between the projector 10 and the projection target object SC. The processing device 240 generates the correction information based on one or a plurality of first feature points and one or a plurality of second feature points described below. The one or plurality of first feature points are natural feature point(s) in the third image formed by converting the stored first picked-up image into the projector coordinate system, based on the first correspondence. The one or plurality of second feature points correspond to the one or plurality of first feature points. The one or plurality of second feature points are natural feature point(s) in the fourth image formed by converting the stored second picked-up image into the projector coordinate, based on the second correspondence.

In the correction processing SB150, the processing device 240 corrects the image GC1 according to the correction information and thus generates the image GC2, which is a corrected image. The processing device 240 then causes the projector 10 to project the image GC2.

In the projection method according to this aspect, an image of the projection target object SC is picked up, using the image pickup device 220, which is separate from the projector 10 and is not fixed. Thus, a projection image to be projected onto the projection target object SC from the projector 10 can be generated, adapting to a change in the positional relationship between the projector 10 and the projection target object SC.

According to another aspect, in the projection method, the correction information may be generated, based on the position in the third image of the first feature point(s) extracted from the third image and the position in the fourth image of the second feature point(s) extracted from the fourth image and corresponding to the first feature point(s).

According to still another aspect, in the projection method, the first feature point(s) may be extracted, based on a value of a luminance of each pixel forming the third image.

Similarly, the second feature point(s) may be extracted, based on a value of a luminance of each pixel forming the fourth image.

According to still another aspect, in the projection method, the correction information may be generated, based on a plurality of the first feature points and a plurality of the second feature points.

According to still another aspect, the projection method may include causing a user to select one or a plurality of the first feature points used to generate the correction information, from among a plurality of the first feature points. In the aspect where the user is made to select one or a plurality of the first feature points used to generate the correction information, the correction information may be generated, based on the one or plurality of the first feature points selected by the user and one or a plurality of the second feature points corresponding one-to-one to the one or plurality of the first feature points selected by the user.

According to still another aspect, in the projection method, the correction information may be generated, based on one or a plurality of the first feature points located in a first area in the third image, of a plurality of the first feature points, and one or a plurality of the second feature points located in a second area corresponding to the first area, in the fourth image.

According to still another aspect, in the projection method, at least one of the first image and the second image may be an image including a first, a second, a third, and a fourth markers. When the first image is an image including the first, the second, the third, and the fourth markers, the first correspondence may be expressed by a first transformation matrix establishing a one-to-one correspondence between the first, the second, the third, and the fourth markers in the first image and the first, the second, the third, and the fourth markers shown in the first picked-up image. When the second image is an image including the first, the second, the third, and the fourth markers, the second correspondence may be expressed by a second transformation matrix establishing a one-to-one correspondence between the first, the second, the third, and the fourth markers in the second image and the first, the second, the third, and the fourth markers shown in the second picked-up image.

According to still another aspect, in the projection method, at least one of the first image and the second image may be a pattern image showing one of a binary code pattern, a Gray code pattern, and a phase shift pattern. When the first image is the pattern image, the first correspondence may be expressed by a first transformation matrix establishing a correspondence between a pattern expressed by the first image and a pattern shown in the first picked-up image. When the second image is the pattern image, the second correspondence may be expressed by a second transformation matrix establishing a correspondence between a pattern expressed by the second image and a pattern shown in the second picked-up image.

According to still another aspect, in the projection method, the correction information may be generated when a difference between a luminance of a first pixel in the third image and a luminance of a second pixel corresponding to the first pixel, in the fourth image, is equal to or greater than a threshold.

According to still another aspect, in the projection method, a sensor detecting a vibration may be provided in at least one of the projector 10 and the projection target object SC. In the aspect where the sensor is provided in at least one of the projector 10 and the projection target object SC, the control signal may be an output signal from the sensor.

Also, in order to solve the foregoing problems, according to another aspect, a projection method for projecting a projection image onto the projection target object SC from the projector 10 is provided. The projection method includes the first projection processing, the first image pickup processing, the first specification processing, the second projection processing, the second image pickup processing, the second specification processing, the third image pickup processing, the fourth image pickup processing, the generation processing, and the correction processing, described below. In the first projection processing, the first image is projected onto the projection target object SC from the projector 10 before the projection of the projection image. In the first image pickup processing, the first picked-up image of the projection target object SC in the state where the first image is projected, picked up by the image pickup device 220 from the first position, is stored. In the first specification processing, the first correspondence between the projector coordinate system representing a position on an image projected from the projector 10 and the camera coordinate system representing a position on an image picked up by the image pickup device 220 is specified, based on the first picked-up image and the first image. The second projection processing is executed in response to the reception of a control signal representing the occurrence of a change in the positional relationship between the projector 10 and the projection target object SC after the first picked-up image is stored. In the second projection processing, the second image is projected onto the projection target object SC from the projector 10. In the second image pickup processing, the second picked-up image of the projection target object SC in the state where the second image is projected, picked up by the image pickup device 220 from the second position, is stored. In the second specification processing, the second correspondence between the projector coordinate system and the camera coordinate system is specified, based on the second picked-up image and the second image. The third image pickup processing is executed before causing the projector 10 to project the second image onto the projection target object SC in response to the reception of the control signal. In the third image pickup processing, the third picked-up image of the projection target object SC picked up by the image pickup device 220 from the first position is stored. The fourth image pickup processing is executed after causing the projector 10 to project the second image onto the projection target object SC in response to the reception of the control signal. In the fourth image pickup processing, the fourth picked-up image of the projection target object SC picked up by the image pickup device 220 from the second position is stored. In the generation processing, the correction information representing the amount of correction corresponding to the change in the positional relationship, based on one or a plurality of first feature points in the fifth image acquired by converting the stored third picked-up image into the projector coordinate system, based on the first correspondence, and one or a plurality of second feature points corresponding to the one or plurality of the first feature points, in a sixth image acquired by converting the stored fourth picked-up image into the projector coordinate system, based on the second correspondence. The correction processing is the processing of causing the projector 10 to project the projection image that is corrected based on the correction information.

Also, in order to solve the foregoing problems, according to still another aspect, the projection system 1 is provided. The projection system 1 includes: the projector 10 projecting a projection image onto the projection target object SC, and the information processing device 20 controlling the projector 10. The information processing device 20 includes the image pickup device 220, the storage device 230, and the processing device 240. The processing device 240 executes the first projection processing SA110, the first image pickup processing SA120, the first specification processing SA130, the second projection processing SB110, the second image pickup processing SB120, the second specification processing SB130, the generation processing SB140, and the correction processing SB150. In the projection system 1 according to this aspect, since an image of the projection target object SC is picked up using the image pickup device 220, which is separate from the projector 10 and not fixed, the projection image projected onto the projection target object SC from the projector 10 can be generated, adapting to a change in the positional relationship between the projector 10 and the projection target object SC.

Also, in order to solve the foregoing problems, according to still another aspect, the program 231 is provided. The program 231 causes the processing device 240, which is a computer controlling the projector 10 projecting a projection image onto the projection target object SC, to execute the first projection processing SA110, the first image pickup processing SA120, the first specification processing SA130, the second projection processing SB110, the second image pickup processing SB120, the second specification processing SB130, the generation processing SB140, and the correction processing SB150. In the program 231 according to this aspect, since an image of the projection target object SC is picked up using the image pickup device 220, which is separate from the projector 10 and not fixed, the projection image projected onto the projection target object SC from the projector 10 can be generated, adapting to a change in the positional relationship between the projector 10 and the projection target object Sc.

What is claimed is:

1. A projection method comprising:
    projecting, by a projector, a first image onto a projection target object before projecting a projection image;
    storing a first picked-up image of the projection target object in a state where the first image is projected, picked up by an image pickup device;
    determining a first correspondence between a projector coordinate system and a camera coordinate system, the projector coordinate system being a coordinate system of an image that is projected by the projector on the projection target object, the camera coordinate system being a coordinate system of an image that is picked-up by the image pickup device from the projection target object, the projector coordinate system representing a position on the image projected by the projector, the camera coordinate system representing a position on the image picked up by the image pickup device, the first correspondence being determined based on the first picked-up image and the first image;
    projecting, by the projector, a second image onto the projection target object in response to reception of a control signal representing occurrence of a change in a positional relationship between the projector and the projection target object;
    storing a second picked-up image of the projection target object in a state where the second image is projected, picked up by the image pickup device;
    determining a second correspondence between the projector coordinate system and the camera coordinate system, based on the second picked-up image and the second image;

generating correction information representing an amount of correction corresponding to the change in the positional relationship, based on one or a plurality of first feature points in a third image acquired by converting the first picked-up image into the projector coordinate system, based on the first correspondence, and one or a plurality of second feature points corresponding to the one or plurality of the first feature points, in a fourth image acquired by converting the second picked-up image into the projector coordinate system, based on the second correspondence; and projecting, by the projector, the projection image that is corrected based on the correction information.

2. The projection method according to claim 1, wherein the one or plurality of the first feature points are extracted, based on a value of a luminance of each pixel forming the third image, and the one or plurality of the second feature points are extracted, based on a value of a luminance of each pixel forming the fourth image.

3. The projection method according to claim 1, wherein the correction information is generated, based on a plurality of the first feature points and a plurality of the second feature points.

4. The projection method according to claim 3, further comprising:
causing a user to select one or a plurality of the first feature points used to generate the correction information, from among the plurality of the first feature points, wherein
the correction information is generated, based on the one or plurality of the first feature points selected by the user and one or a plurality of the second feature points corresponding one-to-one to the one or plurality of the first feature points selected by the user.

5. The projection method according to claim 3, wherein the correction information is generated, based on one or a plurality of the first feature points located in a first area in the third image, of the plurality of the first feature points, and one or a plurality of the second feature points located in a second area corresponding to the first area, in the fourth image.

6. The projection method according to claim 1, wherein at least one of the first image or the second image is an image including a first marker, a second marker, a third marker, and a fourth marker,
when the first image is an image including the first marker, the second marker, the third marker, and the fourth marker, the first correspondence is expressed by a first transformation matrix establishing a one-to-one correspondence between the first marker, the second marker, the third marker, and the fourth marker in the first image and the first marker, the second marker, the third marker, and the fourth marker shown in the first picked-up image, and
when the second image is an image including the first marker, the second marker, the third marker, and the fourth marker, the second correspondence is expressed by a second transformation matrix establishing a one-to-one correspondence between the first marker, the second marker, the third marker, and the fourth marker in the second image and the first marker, the second marker, the third marker, and the fourth marker shown in the second picked-up image.

7. The projection method according to claim 1, wherein at least one of the first image or the second image is a pattern image showing one of a binary code pattern, a Gray code pattern, or a phase shift pattern,
when the first image is the pattern image, the first correspondence is expressed by a first transformation matrix establishing a correspondence between a pattern expressed by the first image and a pattern shown in the first picked-up image, and
when the second image is the pattern image, the second correspondence is expressed by a second transformation matrix establishing a correspondence between a pattern expressed by the second image and a pattern shown in the second picked-up image.

8. The projection method according to claim 1, wherein the correction information is generated when a difference between a luminance of a first pixel in the third image and a luminance of a second pixel corresponding to the first pixel, in the fourth image, is equal to or greater than a threshold.

9. The projection method according to claim 1, wherein a sensor detecting a vibration is provided in at least one of the projector or the projection target object, and the control signal is outputted from the sensor.

10. A projection method comprising:
projecting, by a projector, a first image onto a projection target object before projecting a projection image;
storing a first picked-up image of the projection target object in a state where the first image is projected, picked up by an image pickup device from a first position;
determining a first correspondence between a projector coordinate system and a camera coordinate system, the projector coordinate system being a coordinate system of an image that is projected by the projector on the projection target object, the camera coordinate system being a coordinate system of an image that is picked-up by the image pickup device from the projection target object, the projector coordinate system representing a position on the image projected by the projector, the camera coordinate system representing a position on the image picked up by the image pickup device, the first correspondence being determined based on the first picked-up image and the first image;
projecting, by the projector, a second image onto the projection target object in response to reception of a control signal representing occurrence of a change in a positional relationship between the projector and the projection target object;
storing a second picked-up image of the projection target object in a state where the second image is projected, picked up by the image pickup device from a second position;
determining a second correspondence between the projector coordinate system and the camera coordinate system, based on the second picked-up image and the second image;
storing a third picked-up image of the projection target object picked up by the image pickup device from the first position, before projecting, by the projector, the second image onto the projection target object in response to the reception of the control signal;
storing a fourth picked-up image of the projection target object picked up by the image pickup device from the second position, after projecting, by the projector, the second image onto the projection target object in response to the reception of the control signal;
generating correction information representing an amount of correction corresponding to the change in the positional relationship, based on one or a plurality of first feature points in a fifth image acquired by converting the third picked-up image into the projector coordinate system, based on the first correspondence, and one or a plurality of second feature points corresponding to the one or plurality of the first feature points, in a sixth image acquired by converting the fourth picked-up image into the projector coordinate system, based on the second correspondence; and projecting, by the projector, the projection image that is corrected based on the correction information.

11. A non-transitory computer-readable storage medium storing a program for making a computer execute a method comprising:

causing a projector to project a first image onto a projection target object before projecting a projection image;

causing a storage device to store a first picked-up image of the projection target object in a state where the first image is projected, picked up by an image pickup device;

determining a first correspondence between a projector coordinate system and a camera coordinate system, the projector coordinate system being a coordinate system of an image that is projected by the projector on the projection target object, the camera coordinate system being a coordinate system of an image that is picked-up by the image pickup device from the projection target object, the projector coordinate system representing a position on the image projected by the projector, the camera coordinate system representing a position on the image picked up by the image pickup device, the first correspondence being determined based on the first picked-up image and the first image;

causing the projector to project a second image onto the projection target object in response to reception of a control signal representing occurrence of a change in a positional relationship between the projector and the projection target object;

causing the storage device to store a second picked-up image of the projection target object in a state where the second image is projected, picked up by the image pickup device;

determining a second correspondence between the projector coordinate system and the camera coordinate system, based on the second picked-up image and the second image;

generating correction information representing an amount of correction corresponding to the change in the positional relationship, based on one or a plurality of first feature points in a third image acquired by converting the first picked-up image stored in the storage device into the projector coordinate system, based on the first correspondence, and one or a plurality of second feature points corresponding to the one or plurality of the first feature points, in a fourth image acquired by converting the second picked-up image stored in the storage device into the projector coordinate system, based on the second correspondence; and causing the projector to project the projection image that is corrected based on the correction information.

* * * * *